(12) United States Patent
Fujii et al.

(10) Patent No.: US 7,749,587 B2
(45) Date of Patent: Jul. 6, 2010

(54) OPTICAL DISK

(75) Inventors: Koichi Fujii, Niiza (JP); Kazuo Murakami, Kawagoe (JP)

(73) Assignee: Dainippon Ink and Chemicals, Inc., Tokyo (JP)

( * ) Notice: Subject to any disclaimer, the term of this patent is extended or adjusted under 35 U.S.C. 154(b) by 962 days.

(21) Appl. No.: 10/573,709

(22) PCT Filed: Sep. 28, 2004

(86) PCT No.: PCT/JP2004/014556

§ 371 (c)(1),
(2), (4) Date: Mar. 27, 2006

(87) PCT Pub. No.: WO2005/031729

PCT Pub. Date: Apr. 7, 2005

(65) Prior Publication Data

US 2007/0036935 A1 Feb. 15, 2007

(30) Foreign Application Priority Data

Sep. 30, 2003 (JP) ............................. 2003-340350
Dec. 22, 2003 (JP) ............................. 2003-424804

(51) Int. Cl.
*B32B 3/02* (2006.01)
(52) U.S. Cl. ................. 428/64.1; 428/64.4; 430/270.11
(58) Field of Classification Search ........................ None
See application file for complete search history.

(56) References Cited

U.S. PATENT DOCUMENTS

| | | | |
|---|---|---|---|
| 5,102,709 A * | 4/1992 | Tachibana et al. | 428/65.1 |
| 5,578,415 A | 11/1996 | Hayashi et al. | |
| 6,071,667 A * | 6/2000 | Hagiwara et al. | 430/197 |
| 6,818,681 B2 * | 11/2004 | Obori | 522/181 |
| 6,924,017 B2 * | 8/2005 | Shoji | 428/64.1 |
| 6,925,051 B2 * | 8/2005 | Wisnudel et al. | 369/286 |
| 2001/0017819 A1 * | 8/2001 | Shoji | 369/1 |

FOREIGN PATENT DOCUMENTS

| | | |
|---|---|---|
| CN | 1393406 | 1/2003 |
| EP | 1327978 | 7/2003 |
| JP | 2-141284 | 5/1990 |
| JP | 3-134081 | 6/1991 |
| JP | 2002-146331 | 5/2002 |
| JP | 2002-212514 | 7/2002 |
| JP | 2002-265886 | 9/2002 |
| JP | 2002-285042 | 10/2002 |
| JP | 2003-213160 | 7/2003 |
| JP | 2003-239089 | 8/2003 |

OTHER PUBLICATIONS

Office Action issued on Apr. 11, 2008, on the counterpart Chinese Patent Application No. 200480028159.9 and the English translation thereof.
Supplementary European Search Report dated Apr. 14, 2010, issued on the corresponding European Patent Application No. 04788440.8.

* cited by examiner

*Primary Examiner*—Elizabeth Mulvaney
(74) *Attorney, Agent, or Firm*—Edwards Angell Palmer & Dodge LLP

(57) ABSTRACT

An optical disk comprising a first substrate, a first reflective layer for reflecting laser beams for information reading formed on the first substrate, and a resin layer made of a cured film of an ultraviolet curable composition formed on the first reflective layer, wherein the first reflective layer is a reflective layer made of silver or an alloy containing silver as a main component, and the ultraviolet curable composition contains (a) a radical polymerizable compound, (b) a compound represented by the following formula (1) and (c) a radical photopolymerization initiator.

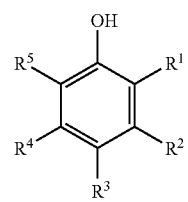

(1)

4 Claims, No Drawings

OPTICAL DISK

TECHNICAL FIELD

The present invention relates to an optical disk comprising a reflective layer made of silver or an alloy containing silver as a main component.

BACKGROUND ART

Typical examples of a laminated optical disk include DVD (digital versatile disk or digital video disk). This DVD is produced by a method of at least laminating two substrates for optical disk, the substrate being obtained by forming an information recording layer on one substrate for optical disk. A laminating agent used in case of lamination is generally an adhesive comprising an ultraviolet curable composition.

The information recording layer is a laminate comprising a substrate for optical disk made of a synthetic resin such as polycarbonate; a layer comprising irregularities referred to as pits, a phase-change material, a pigment and the like, formed on the substrate, and a semi-reflective or complete reflective layer for reflecting laser beams for information reading, formed thereon. The semi-reflective layer and the complete reflective layer are layers which are formed on the top of the information recording layer and are generally composed of a thin film of a metal or a metal alloy.

In a reproducing-only type DVD having a structure in which two substrates for optical disk are laminated, various optical disks exist. For example, an optical disk referred to as "DVD-10" is produced by preparing two polycarbonate substrates for optical disk wherein irregularities corresponding to recording information referred to as pits are provided on one surface of a substrate, and then an aluminum layer is formed as a layer for reflecting laser beams for information reading thereon, and laminating them using the aluminum layer as an adhesive surface. "DVD-5" is produced by laminating the above polycarbonate substrate for producing "DVD-10" with a conventional transparent polycarbonate substrate with no information recording layer formed thereon. "DVD-9" is produced by laminating a substrate, which is obtained by forming an aluminum reflective layer on pits provided on one surface of a substrate, with a substrate, which is obtained by forming a semi-reflective layer made of gold or an alloy containing gold as a main component, silver or an alloy containing silver as a main component, or a silicon compound on pits provided on one surface of a substrate, using the reflective layers as an adhesive surface. Furthermore, "DVD-18" is produced by laminating two substrates each comprising two information recording layers formed on one surface. "DVD-9", which has a large recording capacity and is capable of reading information of two layers from one surface, is currently prevailing.

As the material of a semi-reflective layer of DVD-9 or the like, gold or a silicon compound is mainly used. However, gold is very expensive and is therefore disadvantageous in view of cost and the silicon compound has a drawback that a film formation is very difficult. Therefore, a study on replacement by silver or an alloy containing silver as a main component has intensively been made because it is cheap as compared with gold and a film is formed with ease.

However, there arose a problem that durability of DVD-9 comprising silver or an alloy containing silver as a main component as a semi-reflective layer drastically deteriorates, when a conventional ultraviolet curable adhesive which is used in the production of DVD-9 comprising gold or a silicon compound as a semi-reflective layer is used. Specifically, when DVD-9, which uses a silver or an alloy containing silver as a main component in a semi-reflective layer and uses a conventional adhesive, is exposed in a high-temperature and high-humidity atmosphere for a long time, deterioration of the surface of silver or an alloy containing silver as a main component is caused by an adverse influence of the adhesive and an increase in number of errors of reading signals and poor appearance occur, and thus durability of DVD-9 drastically deteriorates.

To solve the above problems in a high-temperature and high-humidity atmosphere, for example, there is proposed a technique in which an ultraviolet curable composition containing phenylthioethyl (meth)acrylates is used as an adhesive of DVD-9 (see, for example, claims and examples of Japanese Unexamined Patent Publication (Kokai) No. 2002-212514, hereinafter referred to as Patent Document 1). In Patent Document 1, there is described that, even in case of DVD-9 in which silver or an alloy containing silver as a main component is used as a semi-reflective layer, after conducting a test in a high-temperature and high-humidity atmosphere at 80° C. and 85%RH for 500 hours, neither discoloration of the semi-reflective layer nor formation of pinholes occur and the same durability as that of DVD-9 in which gold is used as the semi-reflective layer can be obtained.

Another problem in an optical disk comprising a metal reflective layer such as DVD-9 is corrosion of the metal reflective layer due to an ultraviolet curable composition used as an adhesive. To solve the problem, for example, there is reported a technique in which an adhesive composition containing a cationic polymerizable compound, a photocationic polymerization initiator, and hydroxycarboxylic acid as an aluminum corrosion inhibitor is coated onto a thin film such as aluminum deposited film (see, for example, claims, column 6 and column 25 of Japanese Unexamined Patent Publication (Kokai) No. 2002-146331, hereinafter referred to as Patent Document 2). Examples of the hydroxycarboxylic acid include citric acid, isocitric acid, tartaric acid, malic acid, lactic acid, 2-methyllactic acid, hydroxypyruvic acid, dimethylolbutanoic acid, dimethylolpropionic acid, α-hydroxyisobutyric acid, α,α-diphenylglycolic acid, mandelic acid, 6-hydroxy-2-naphthoic acid, p-hydroxybenzoic acid, 5-hydroxyisophthalic acid, p-hydroxyphenylacetic acid, p-hydroxyphenylpropionic acid, citrazinic acid, chelidamic acid and gallic acid.

In the optical disk comprising a metal reflective layer, adhesion to the metal reflective layer of the ultraviolet curable composition used as the adhesive is also an important problem. For example, there is proposed a technique relating to a composition having excellent adhesion to both an amorphous silicone resin substrate and a metal reflective layer made of gold, silver, copper, aluminum or the like (see, for example, claims, column 28, column 29 and column 34 of Japanese Unexamined Patent Publication (Kokai) No. 2002-285042, hereinafter referred to as Patent Document 3). In this technique, a technique relating to an ultraviolet curable composition for optical disk, containing dicyclopentadiene diacrylate, a thixanthone-based compound and (meth)acrylate having a phosphoric acid is proposed. There is also described that polymerization inhibitors such as hydroquinone monomethyl ether, t-butyl catechol, p-benzoquinone, 2,5-t-butyl-hydroquinone and phenothiazine can be used in an amount within a range from 0.1 to 5% by mass based on the total amounts of the ultraviolet curable composition for optical disk.

By the way, there is described a technique regarding a rapid curing two-component type acrylic adhesive which is excellent in adhesion in which an adhesive composition which contains an acrylic compound selected from (meth)acrylic acid and esters thereof, a peroxyester-based polymerization initiator, a gallic acid derivative and other additives is used as a first component solution (see, for example, claims, page 6, upper right column, line 5 to the same page, lower left column, line 17, and examples of Japanese Unexamined Patent Publication (Kokai) No. 3-134081, hereinafter referred to as Patent Document 4). There is also proposed that, in order to cure a first component solution squeezed out of the bonding portion upon bonding, a photopolymerization initiator is added to an adhesive composition and the squeezed-out adhesive is cured by irradiating with ultraviolet light.

As described above, in the technical field of an optical disk, improvements in durability when exposed in a high-temperature and high-humidity atmosphere for a long period, corrosion resistance of a metal reflective layer, adhesion to a metal reflective layer of an ultraviolet curable composition or the like have hitherto been studied. The present inventors have intensively studied about the development of an optical disk comprising a reflective layer made of silver or an alloy containing silver as a main component, and also studied these conventionally known problems. As a result, they have found that additional problem exists, in addition to the above problems. The problem is a problem in which, when an optical film comprising a reflective layer made of silver or an alloy containing silver as a main component is exposed to room light such as fluorescent lamp, this reflective layer is blackened thereby to cause a decrease in reflectance and an increase in PI error (parity of inner-code error), and thus it becomes impossible to read information in the worst case. It is very important to solve this problem so as to improve practical characteristics of an optical disk comprising a reflective layer made of silver or an alloy containing silver as a main component.

Thus, an object of the present invention is to provide an optical disk comprising a reflective layer made of silver or an alloy containing silver as a main component, having excellent light resistance, which does not cause blackening of a reflective layer and also causes neither an increase in read error (PI error) of signals nor a decrease in reflectance even when exposed to room light such as fluorescent lamp.

DISCLOSURE OF THE INVENTION

To solve the problems to be solved in the present invention, the present inventors have studied about optical disks using an ultraviolet curable composition described in examples of the above prior arts (Patent Document 1 to Patent Document 3). However, in the above prior arts, there is not any description about light resistance of an optical disk comprising a semi-reflective layer made of silver or an alloy containing silver as a main component, and also there is neither any description about a specific ultraviolet curable composition to be used in the optical disk comprising a semi-reflective layer made of silver or an alloy containing silver as a main component, nor any description about specific additive to be used in the ultraviolet curable composition. There was confirmed a problem that, when a light resistance test of optical disks produced by using the above prior arts are actually tested, severe discoloration of a reflective layer made of silver or an alloy containing silver as a main component occurs and reflectance decreases and also PI error increases.

In Patent Document 4, bonding regarding an optical disk is not disclosed. Also Patent Document 4 does not suggest noticeable methods with respect to a method for improving light resistance of an optical disk comprising a reflective layer made of silver or an alloy containing silver as a main component.

The present inventors have considered at first that a blackening phenomenon of a reflective layer made of silver or an alloy containing silver as a main component occurred after exposing to room light such as fluorescent lamp is caused by surface oxidation of the reflective layer. They have studied about, as a composition for forming a resin layer to be formed on the reflective layer, an ultraviolet curable composition containing antioxidants such as citric acid, tartaric acid, malic acid, lactic acid, hydroxypyruvic acid, dimethylolpropionic acid, α-hydroxyisobutyric acid, mandelic acid, 6-hydroxy-2-naphthoic acid, p-hydroxybenzoic acid, 5-hydroxyisophthalic acid, p-hydroxyphenylacetic acid and gallic acid added therein. As a result of the studying, it has been found that the above problem can be solved only by a system containing gallic acid, among the above compounds.

The present inventors have further studied about compounds having a chemical structure similar to that of gallic acid, for example, monohydroxy compounds such as phenol, cresol and mesitol, dihydroxy compound such as hydroquinone, 2-hydroxyhydroquinone, 2,5-t-butyl-hydroquinone, catechol, t-butyl catechol, resorcinol and orcinol, and trihydroxy compounds such as pyrogallol, and found that a compound of a specific structure having at least two phenolic hydroxyl groups exerts the same effect as that of gallic acid, and thus the present invention has been completed.

The optical disk of the present invention comprises a first substrate, a first reflective layer for reflecting laser beams for information reading formed on the first substrate, and a resin layer made of a cured film of an ultraviolet curable composition formed on the first reflective layer, wherein the first reflective layer is a reflective layer made of silver or an alloy containing silver as a main component, and the ultraviolet curable composition contains:

(a) a radical polymerizable compound, (b) a compound represented by the formula (1):

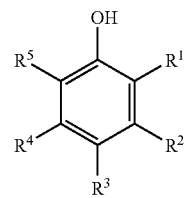

(1)

wherein $R^1$, $R^2$, $R^3$, $R^4$ and $R^5$ each independently represents (i) a hydrogen atom, (ii) a halogen atom, (iii) a hydroxyl group, (iv) an alkoxyl group having 1 to 8 carbon atoms, (v) a carboxyl group, (vi) a group represented by the formula

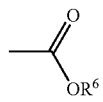

(2)

(wherein $R^6$ represents an alkyl group having 1 to 20 carbon atoms which may be substituted with a halogen atom, or an alkenyl group having 1 to 20 carbon atoms which may be substituted with a halogen atom), or (vii) an alkyl or alkenyl group having 1 to 24 carbon atoms which may have a carboxyl group, an alkoxycarbonyl group, an acyloxyl group or an alkoxyl group as a substituent, and at least one of $R^1$, $R^2$, $R^3$, $R^4$ and $R^5$ is a hydroxyl group), and (c) a radical photopolymerization initiator According to the present invention, an optical disk can be obtained which does not cause blackening of a reflective layer made of silver or an alloy containing silver as a main component and also causes no increase in read error (PI error) of signals and less change in reflectance even when exposed to room light such as fluorescent lamp. Therefore, it becomes easy to use, as a material of a semi-reflective layer or a reflective layer which forms an information recording layer, silver or an alloy containing silver as a main component, and also it becomes possible to supply an optical disk such as "DVD-9" as a high-reliable optical disk at a low cost.

BEST MODE FOR CARRYING OUT THE INVENTION

The ultraviolet curable composition use in an optical disk comprising a reflective layer made of silver or an alloy containing silver as a main component according to the present invention contains a compound represented by the formula (1).

The reflective layer as used herein refers to a complete reflective layer which does not substantially transmit laser beams for information reading or a semi-reflective layer. The films are used for reflecting laser beams used for information reading. The (meth)acrylic acid refers to acrylic acid or methacrylic acid, and the same may be said for derivatives of acrylic acid or methacrylic acid.

The compound represented by the formula (1) includes compounds each having a different structure, and is preferably gallic acid or gallic acid ester represented by the following formula (3):

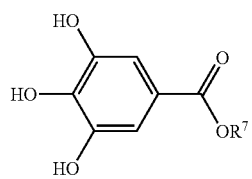
(3)

wherein $R^7$ represents a hydrogen atom, an alkyl group having 1 to 20 carbon atoms which may be substituted with a halogen atom, or an alkenyl group having 1 to 20 carbon atoms which may be substituted with a halogen atom.

The alkyl group and alkenyl group may be branched or linear and the halogen atom is preferably a fluorine atom, a chlorine atom, a bromine atom or an iodine atom. $R^7$ is preferably a hydrogen atom, or a nonsubstituted alkyl group which may have a branched chain having 1 to 20 carbon atoms, and is more preferably a hydrogen atom, or a nonsubstituted alkyl group which may have a branched chain having 1 to 8 carbon atoms, and particularly preferably a hydrogen atom, or a nonsubstituted alkyl group having 1 to 4 carbon atoms.

Specific examples of the gallic acid ester include methyl gallate, ethyl gallate, propyl gallate, isopropyl gallate, isopentyl gallate, octyl gallate, dodecyl gallate, tetradecyl gallate, hexadecyl gallate and octadecyl gallate. As the compound represented by the formula (3), gallic acid is preferably used.

As the gallic acid, for example, products manufactured by Dainippon Pharmaceutical Co., Ltd. are easily available.

The compound represented by the formula (1) is preferably a compound represented by the following formula (4):

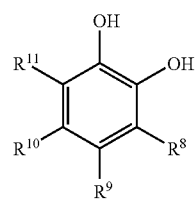
(4)

wherein $R^8$, $R^9$, $R^{10}$ and $R^{11}$ each independently represents a hydrogen atom, a halogen atom, an alkoxyl group having 1 to 8 carbon atoms, an alkyl group having 1 to 24 carbon atoms which may have —COOH, —COOR$^{12}$, —OCOR$^{13}$ or —OR$^{14}$ as a substituent, or alkenyl group having 1 to 24 carbon atoms which may have —COOH, —COOR$^{12}$, —OCOR$^{13}$ or —OR$^{14}$ as a substituent (wherein $R^{12}$, $R^{13}$, and $R^{14}$ each independently represents an alkyl group having 1 to 8 carbon atoms or an alkenyl group having 1 to 8 carbon atoms).

In the formula (4), specific examples of the substituents as for $R^8$, $R^9$, $R^{10}$ and $R^{11}$ include (i) hydrogen atom, (ii) halogen atom such as fluorine atom, chlorine atom, bromine atom or iodine atom, (iii) alkoxyl group such as methoxy, ethoxy, butoxy or octyloxy, (iv) alkyl group such as methyl, butyl, hexyl, octyl, lauryl or octadecyl, (v) alkenyl group such as ethenyl, propenyl or 2-butenyl, and (vi) 4-carboxybutyl, 2-methoxycarbonylethyl, methoxymethyl and ethoxymethyl.

Among the compounds represented by the formula (4), catechol, 3-sec-butyl catechol, 3-tert-butyl catechol, 4-sec-butyl catechol, 4-tert-butyl catechol, 3,5-di-tert-butyl catechol, 3-sec-butyl-4-tert-butyl catechol, 3-tert-butyl-5-sec-butyl catechol, 4-octyl catechol and 4-stearyl catechol are preferable, and catechol and 4-tert-butyl catechol are more preferable. It is particularly preferred to use 4-tert-butyl catechol. Examples of a commercially available product of 4-tert-butyl catechol include DIC TBC-5P (trade name) manufactured by DAINIPPON INK AND CHEMICALS Inc.

The compound represented by the formula (1) is preferably a compound represented by the following formula (5) or (6):

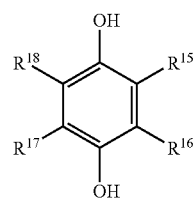
(5)

wherein $R^{15}$, $R^{16}$, $R^{17}$ and $R^{18}$ each independently represents, a hydrogen atom, a halogen atom, an alkoxyl group having 1 to 8 carbon atoms, an alkyl group having 1 to 24 carbon atoms which may have —COOH, —COOR$^{12}$, —OCOR$^{13}$ or —OR$^{14}$ as a substituent, or an alkenyl group having 1 to 24 carbon atoms which may have —COOH, —COOR$^{12}$, —OCOR$^{13}$ or —OR$^{14}$ as a substituent (wherein $R^{12}$, $R^{13}$ and $R^{14}$ each independently represents an alkyl group having 1 to 8 carbon atoms or an alkenyl group having 1 to 8 carbon atoms), or

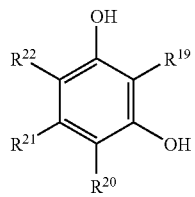

(6)

wherein $R^{19}$, $R^{20}$, $R^{21}$ and $R^{22}$ each independently represents a hydrogen atom, a halogen atom, an alkoxyl group having 1 to 8 carbon atoms, an alkyl group having 1 to 24 carbon atoms which may have —COOH, —COOR$^{12}$, —OCOR$^{13}$ or —OR$^{14}$ as a substituent, or an alkenyl group having 1 to 24 carbon atoms which may have —COOH, —COOR$^{12}$, —OCOR$^{13}$ or —OR$^{14}$ as a substituent (wherein $R^{12}$, $R^{13}$, and $R^{14}$ each independently represents an alkyl group having 1 to 8 carbon atoms or an alkenyl group having 1 to 8 carbon atoms).

Specific examples of $R^{15}$, $R^{16}$, $R^{17}$ and $R^{18}$ in the formula (5) and $R^{19}$, $R^{20}$, $R^{21}$ and $R^{22}$ in the formula (6) include hydrogen atom, methyl group, propyl group, hexyl group, nonyl group, dodecyl group, iso-butyl group, sec-butyl group, tert-butyl group, neopentyl group, iso-hexyl group and tert-octyl group.

Among the compounds represented by the formula (5), hydroquinone, 2-hydroxyhydroquinone, 2,5-di-tert-butylhydroquinone, 2,5-bis(1,1,3,3-tetramethylbutyl)hydroquinone and 2,5-bis(1,1-dimethylbutyl)hydroquinone are preferable. Among the compounds represented by the formula (6), resorcinol (benzene-1,3-diol) and orcinol (5-methylbenzene-1,3-diol) are preferable. Among these compounds, the compounds represented by the formula (5) is preferable as compared with the compounds represented by the formula (6). Among the compounds represented by the formula (5), hydroquinone (benzene-1,4-diol) and 2-hydroxyhydroquinone (benzene-1,2,4-triol) are preferably used. Among the compounds represented by the formula (1), the other compound, which is preferably used in the present invention, is pyrogallol(1,2,3-trihydroxybenzene).

Among the compounds represented by the formulae (3) to (6), gallic acid or gallic acid ester represented by the formula (3) and a hydroquinone-based compound represented by the formula (5) not only prevent blackening of a reflective layer when an optical disk comprising the reflective layer which is made of silver or an alloy containing silver as a main component, is exposed to a fluorescent lamp, but also improve durability in a high-temperature and high-humidity atmosphere. Therefore, they are particularly preferable compounds among the compounds represented by the formula (1) which are added to the ultraviolet curable composition used in the optical disk of the present invention. Among the compounds represented by the formulas (3) and (5), gallic acid is a most preferable compound.

The amount of the compound represented by the formula (1) to be added in the ultraviolet curable composition is preferably within a range from 0.05 to 10% by mass, and more preferably from 0.1 to 10% by mass, still more preferably from 0.3 to 7% by mass, and particularly preferably from 1 to 5 parts by mass, based on the total amounts of the ultraviolet curable composition. When the amount is within the above range, a remarkable effect of improving light resistance is exerted. Furthermore, in the ultraviolet curable composition, the compound represented by the formula (1) is hardly precipitated and it is easy to handle a composition including the compound.

The cured film made of the ultraviolet curable composition using the compound of the formula (1) prevents blackening of a reflective layer made of silver or an alloy containing silver as a main component and causes neither read error of signals nor a decrease in reflectance even when an optical disk comprising a reflective layer made of silver or an alloy containing silver as a main component is exposed to room light such as fluorescent lamp, for example, a light source having a center wavelength within a range from 500 to 650 nm.

As the radical polymerizable compound used in the ultraviolet curable composition, a radical polymerizable monomer and a radical polymerizable oligomer can be used. As the radical polymerizable monomer, a monofunctional (meth)acrylate and a polyfunctional (meth)acrylate can be used and these monomers can be used alone or in combination of two or more.

As the radical polymerizable monomer, known compounds can be used. Examples of the monofunctional (meth)acrylate include ethyl (meth)acrylate, butyl (meth)acrylate, 2-ethylhexyl (meth)acrylate, nonyl (meth)acrylate, tridecyl (meth)acrylate, hexadecyl (meth)acrylate, octadecyl (meth)acrylate, isoamyl (meth)acrylate, isodecyl (meth)acrylate, isostearyl (meth)acrylate, cyclohexyl (meth)acrylate, benzyl (meth)acrylate, methoxyethyl (meth)acrylate, butoxyethyl (meth)acrylate, phenoxyethyl (meth)acrylate, phenoxydiethylene glycol (meth)acrylate, nonylphenoxyethyl (meth)acrylate, tetrahydrofurfuryl (meth)acrylate, glycidyl (meth)acrylate, 2-hydroxyethyl (meth)acrylate, 2-hydroxy-3-phenoxypropyl (meth)acrylate, 3-chloro-2-hydroxypropyl (meth)acrylate, diethylaminoethyl (meth)acrylate, nonylphenoxyethyltetrahydrofurfuryl (meth)acrylate, caprolactone-modified tetrahydrofurfuryl (meth)acrylate, isobornyl (meth)acrylate, dicyclopentanyl (meth)acrylate and dicyclopentenyloxyethyl (meth)acrylate.

Examples of the polyfunctional (meth)acrylate include 1,4-butanediol di(meth)acrylate, 3-methyl-1,5-pentanediol di(meth)acrylate, 1,6-hexanediol di(meth)acrylate, neopentylglycol di(meth)acrylate, 2-methyl-1,8-octanediol di(meth)acrylate, 2-butyl-2-ethyl-1,3-propanediol di(meth)acrylate, tricyclodecane dimethanol di(meth)acrylate, ethylene glycol di(meth)acrylate or polypropylene glycol di(meth)acrylate; di(meth)acrylate of tris(2-hydroxyethyl) isocyanurate; di(meth)acrylate of diol, which is obtained by adding 4 or more mols of ethylene oxide or propylene oxide to 1 mol of neopentyl glycol; di(meth)acrylate of diol, which is obtained by adding 2 mols of ethylene oxide or propylene oxide to 1 mol of bisphenol A; di- or tri(meth)acrylate of triol, which is obtained by 3 or more mols of ethylene oxide or propylene oxide to 1 mol of trimethylolpropane; di(meth)acrylate of diol, which is obtained by adding 4 or more molds of ethylene oxide or propylene oxide to 1 mol of Bisphenol A; trimethylolpropane tri(meth)acrylate, pentaerythritol tri(meth)acrylate, poly(meth)acrylate of dipentaerythritol, ethylene oxide-modified phosphoric acid (meth)acrylate and ethylene oxide-modified alkylated phosphoric acid (meth)acrylate.

Examples of the radical polymerizable oligomer include polyester (meth)acrylate, polyether (meth)acrylate, epoxy (meth)acrylate and urethane (meth)acrylate.

As the photopolymerization initiator in the ultraviolet curable composition, there can be used any conventionally known photopolymerization initiators capable of curing a radical polymerizable monomer or a photoradical polymerizable compound such as radical polymerizable monomer. As the photopolymerization initiator, a molecular cleavage type or hydrogen drawing type photopolymerization initiator is suited for use in the present invention.

As the radical photopolymerization initiator, benzoin isobutyl ether, 2,4-diethylthixanthone, 2-isopropylthixanthone, benzyl, 2,4,6-trimethylbenzoyldiphenylphosphine oxide, 2-benzyl-2-dimethylamino-1-(4-morpholinophenyl)-butan-1-one, bis(2,6-dimethoxybenzoyl)-2,4,4-trimethyl-pentylphosphine oxide and the like are preferably used. As the molecular cleavage type photopolymerization initiator other than the aforementioned compounds, 1-hydroxycyclohexyl phenyl ketone, benzoin ethyl ether, benzyl dimethyl ketal, 2-hydroxy-2-methyl-1-phenylpropan-1-one, 1-(4-isopropylphenyl)-2-hydroxy-2-methylpropan-1-one, 2-methyl-1-(4-methylthiophenyl)-2-morpholinopropan-1-one and the like may be used in combination. Furthermore, hydrogen drawing type photopolymerization initiators such as benzophenone, 4-phenylbenzophenone, isophthalphenone and 4-benzoyl-4'-methyl-diphenyl sulfide can be used in combination. The amount of the radical photopolymerization initiator is preferably within a range from 2 to 10% by mass based on the total amounts of the ultraviolet curable composition.

Sensitizers can be used to the radical photopolymerization initiator. For example, the initiator can be used in combination with amines, which do not cause the addition reaction with the above radical polymerizable component, such as trimethylamine, methyldimethanolamine, triethanolamine, p-dimethylaminoacetophenone, ethyl p-dimethylaminobenzoate, isoamyl p-dimethylaminobenzoate, N,N-dimethylbenzylamine and 4,4'-bis(diethylamino)benzophenone. As a matter of course, it is preferred to select and use the photopolymerization initiator and the sensitizer, which are excellent in solubility in the ultraviolet curable compound and does not inhibit permeability to ultraviolet light.

If necessary, other additives can be added in the ultraviolet curable composition. For example, there can be mixed with thermal polymerization inhibitors, plasticizers, antioxidants such as hindered phenol, hindered amine and phosphate, and silane coupling agents such as epoxy silane, mercaptosilane and (meth)acrylsilane for the purpose of improving various characteristics. Additives, which are excellent in the ultraviolet curable compound and do not inhibit permeability to ultraviolet light, can be selected and used.

Furthermore, antioxidants such as hindered phenol antioxidant are preferably added to the ultraviolet curable composition. The amount of the hindered phenol antioxidant is preferably within a range from 0.01 to 5% by mass based on the total amounts of the ultraviolet curable composition. As the hindered phenol antioxidant, a compound represented by the following formula (7) is preferably used. Among these compounds, 4,6-bis(octylthiomethyl)-o-cresol (of the following formula (8)) is particularly preferable. Examples of the commercially available product of the compound include IRGANOX 1520L (trade name, manufactured by Ciba Specialty Chemicals Inc.). When the ultraviolet curable composition used in the present invention contains 4,6-bis(octylthiomethyl)-o-cresol, durability in a high-temperature and high-humidity atmosphere is improved. It is particularly effective to prevent a decrease in reflectance in a high-temperature and high-humidity atmosphere.

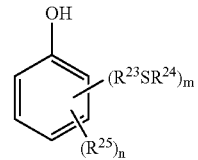

(7)

(wherein $R^{23}$ represents an alkylene having 1 to 10 carbon atoms which may have a branched chain, $R^{24}$ and $R^{25}$ each independently represents an alkyl group having 1 to 16 carbon atoms which may have a branched chain, m represents an integer of 1 to 5, n represents an integer of 0 to 4, and m+n satisfies the following relation $m+n \leqq 5$)

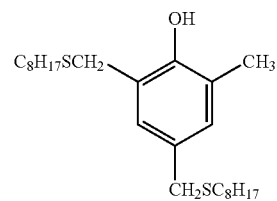

(8)

As the ultraviolet curable composition, a composition which is liquid at a temperature within a range of normal temperature to 40° C. is preferable. It is preferred that the solvent is not used for the ultraviolet curable composition. Even if the solvent is used, it is preferable that the amount is as small as possible. When the composition is coated using a spin coater, it is preferable that viscosity is adjusted within a range from 20 to 1000 mPa·s, and preferably from 100 to 1000 mPa·s when used in DVD.

The optical disk using the ultraviolet curable composition containing the compound represented by the formula (1) of the present invention has such a structure that a first reflective layer for reflecting laser beams for information reading is formed on a first substrate and also a resin layer made of a cured film of the ultraviolet curable composition is formed on the first reflective layer. The optical disk of the present invention is an optical disk having such a structure, or an optical disk which partially has such a structure. Examples of such an optical disk includes CD-ROM or CD-R comprising a thin film made of silver or an alloy containing silver as a main component, as a light reflection layer, and a resin layer made of a cured film of an ultraviolet curable composition, as a protective layer, formed on the light reflection layer. Examples of the optical disk also includes DVD-5 obtained by laminating a substrate comprising a light reflection layer made of a thin film of silver or an alloy containing silver as a main component with the other substrate using an ultraviolet curable composition such that the light reflection layer is used as an adhesive surface.

The optical disk of the present invention may be an optical disk having such a structure that a second substrate comprising a second reflective layer for reflecting laser beams for information reading is formed on the resin layer made of the cured film of the ultraviolet curable composition formed on the aforementioned first reflective layer so as to contact the resin layer with the second reflective layer. Examples of the optical disk having such a structure include laminated optical disks such as DVD-9, DVD-18, DVD-10, which are obtained by laminating two substrates for optical disks each comprising a reflective layer for reflecting laser beams for information reading, wherein at least one substrate of the two substrates for optical disks comprises a reflective layer made of silver or an alloy containing silver as a main component, using the reflective layers of two substrates as an adhesive surface.

Substrate for optical disk, which are usually used as a substrate for optical disk, can be used as a substrate for optical disk of the present invention. A polycarbonate substrate can be used particularly preferably. Examples of the "alloy containing silver as a main component" used in the optical disk of the present invention include a silver alloy described in U.S. Pat. No. 6,007,889 in which a ratio of silver to gold ($Ag_X Au_Y$) satisfies the following relations:

$0.9 < X < 0.999$, and $0.001 \leq Y \leq 0.10$.

The optical disk of the present invention is preferably a reproducing-only type DVD such as "DVD-5", "DVD-10", "DVD-9" or "DVD-18", a writable DVD such as DVD-R or DVD+R, or a rewritable DVD such as DVD-RW, DVD+RW or DVD-RAM, and particularly preferably "DVD-9" or "DVD-18". The thickness of the reflective layer made of silver or an alloy containing silver as a main component in "DVD-9" and "DVD-18" is within a range from 10 to 30 nm, and is less than that of other type DVD. The ultraviolet curable composition used in the present invention exhibits light resistance even used on a thin film made of silver or an alloy containing silver as a main component and is therefore best suited for use as a ultraviolet curable composition used in reproducing-only type "DVD-9" and "DVD-18", each comprising a semi-reflective layer made of silver or an alloy containing silver as a main component.

The optical disk of the present invention is not limited thereto and may be an optical disk obtained by forming an about 0.1 mm thick protective layer, cover layer or light transmitting layer made of a cured film of the ultraviolet curable composition on a thin film made of silver or an alloy containing silver as a main component included in an about 1.1 mm thick substrate for optical disk. That is, the optical disk of the present invention may be an optical disk suited for bluish purple laser beams for information reading which is used as laser beams for information reading, or may be SACD (super audio CD) obtained by laminating two 0.6 mm thick substrates which has similar thickness to those used in DVD.

Examples of the production of "DVD-5", "DVD-10", "DVD-9" and "DVD-18" will be described below. Examples of the optical disk of the present invention are not limited thereto. The ultraviolet curable composition used in the following production examples means an ultraviolet curable composition containing a compound represented by the formula (1) used in the present invention.

(Production of DVD-9)

One substrate for optical disk (A: second substrate) obtained by laminating a 40-60 nm thick metal thin film (second reflective layer) on irregularities referred to as pits for carrying recording information and one substrate for optical disk (B: first substrate) obtained by laminating a 10-30 nm thick semi-reflective layer made of silver or an alloy containing silver as a main component on irregularities referred to as pits for carrying recording information are prepared.

As the second reflective layer, for example, a film made of a material containing aluminum as a main component, a film made of silver or an alloy containing silver as a main component or the like can be used. As the substrate for optical disk, there can be used those known as conventional substrates for optical disk. Examples of the material of the substrate include amorphous polyolefin, polymethyl methacrylate and polycarbonate, and it is particularly preferred to use a polycarbonate substrate.

The ultraviolet curable composition is coated onto the metal thin film (second reflective layer) of the substrate (A: second substrate). The substrate (B: first substrate) laminated with the semi-reflective layer (first reflective layer) is laminated with the substrate (A: second substrate) through the ultraviolet curable composition coated onto the surface of the metal thin film (second reflective layer) so that the surface of the semi-reflective layer (first reflective layer) serves as the adhesive surface. Then, two substrates thus laminated are bonded by irradiating with ultraviolet light from one or both surfaces of the substrate to obtain "DVD-9".

(Production of DVD-18)

After producing DVD-9, the substrate (A: second substrate) is only removed while remaining the metal thin film (second reflective layer) on the side of the substrate (B: first substrate), and a disk intermediate comprising the substrate (B: first substrate), the semi-reflective layer (first reflective layer), the cure film of the ultraviolet curable composition and the metal thin film (second reflective layer) which are laminated in this order is produced. Two said disk intermediates are prepared, and these two disk intermediates are bonded while facing each other so that the each metal thin film (first reflective layer) serves as an adhesive surface to obtain "DVD-18".

(Production of DVD-10)

Two substrates for optical disk (C1: first substrate) and (C2: second substrate) are prepared, each comprising irregularities referred to as pits for carrying recording information and a 40-60 nm thick reflective layer made of silver or an alloy containing silver as a main component laminated on the irregularities. An ultraviolet curable composition is coated onto the reflective layer (first reflective layer) of one substrate (C1: first substrate), and the other substrate (C2: second substrate) is laminated with the substrate (C1: first substrate) through the ultraviolet curable composition coated onto the surface of the reflective layer (first reflective layer) of the substrate (C1: first substrate) so that the surface of the semi-reflective layer (second reflective layer) serves as the adhesive surface. Then, two substrates thus laminated are bonded by irradiating with ultraviolet light from one or both surfaces of the substrate to obtain "DVD-10".

(Production of DVD-5)

A substrate for optical disk (D: first substrate) obtained by laminating a 40-60 nm thick first reflective layer made of silver or an alloy containing silver as a main component on irregularities referred to as pits for carrying recording information is prepared. Separately, a substrate for optical disk (E) having no pits is prepared. An ultraviolet curable composition is coated onto the first reflective layer of a substrate (D: first substrate), and the substrate (D: first substrate) and the substrate (E) are laminated with each other through the composition. Then, two substrates thus laminated are bonded by irradiating with ultraviolet light from one or both surfaces of the substrate to obtain "DVD-5".

Irradiation with ultraviolet light can be conducted by a continuous light irradiation system using a metal halide lamp, a high-pressure mercury lamp or the like, or by a flash irradiation system described in U.S. Pat. No. 5,904,795. The flash irradiation system is more preferable because curing can be efficiently conducted.

EXAMPLES

The present invention will now be described by way of examples, but the present invention is not limited to the following examples. In the following examples, parts means parts by mass.

Example 1

7 Parts of urethane acrylate FAU-74SN (trade name, manufactured by DAINIPPON INK AND CHEMICALS Inc.), 8 parts of a bisphenol A type epoxy acrylate UNIDICK V-5530 (trade name, manufactured by DAINIPPON INK AND CHEMICALS Inc.), 40 parts of diacrylate of an ethylene oxide adduct (4 mols) of bisphenol A represented by the following formula 9, 18 parts of diacrylate of an ethylene oxide adduct (10 mols) of bisphenol A represented by the following formula 10, 11 parts of dipropylene glycol diacrylate, 8 parts of lauryl acrylate, 1.8 parts of an ethylene oxide-modified trimethylolpropane triacrylate represented by the following formula 11, 0.1 parts of an ethylene oxide-modified phosphoric acid methacrylate represented by the following formula 12, 0.1 parts of ethyl dimethylaminobenzoate, 2 parts of 2,4,6-trimethylbenzoyldiphenylphosphine oxide as a photopolymerization initiator, 4 parts of 1-hydroxycyclohexyl phenyl ketone, 0.05 parts of gallic acid and 0.2 parts of an antioxidant IRGANOX 1520L (trade name, manufactured by Ciba Specialty Chemicals) were blended, dissolved by heating at 60° C. with mixing to obtain a pale yellow transparent ultraviolet curable composition. The content of gallic acid based on the total amounts of the ultraviolet curable composition is 0.05% by mass.

Example 2 to Example 6

In the same manner as in case of the composition of Example 1, except that the content of gallic acid was adjusted to 0.1% by mass, 0.5% by mass, 5% by mass or 6% by mass, ultraviolet curable compositions of Example 2 to Example 5 were prepared. In the same manner as in case of the composition of Example 1, except that 0.5% by mass of propyl gallate was used in place of gallic acid, an ultraviolet curable composition of Example 6 was prepared. In Example 5, since a small amount of gallic acid was remained without being dissolved in the ultraviolet curable composition, a filtration treatment was conducted.

Example 7 to Example 10

In the same manner as in case of the compositions of Example 1 to Example 4, except that the antioxidant (trade name: IRGANOX 1520L) was not used, ultraviolet curable compositions of Example 7 to Example 10 were prepared.

Example 11 to Example 15

In the same manner as in case of the composition of Example 1, except that gallic acid of Example 1 was replaced by 4-tert-butyl catechol, an ultraviolet curable composition of Example 11 was prepared. In t same manner as in case of the composition of Example 11, except that the content of 4-tert-butyl catechol was adjusted to 0.1% by mass (Example 12), 0.5% by mass (Example 13), 1% by mass (Example 14) or 5% by mass (Example 15), ultraviolet curable compositions of Example 12 to Example 15 were prepared.

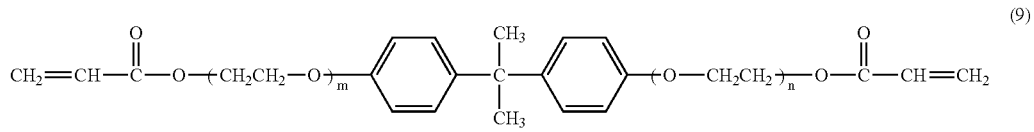

(9)

wherein m and n represent an integer of 1 to 3, and m+n=4

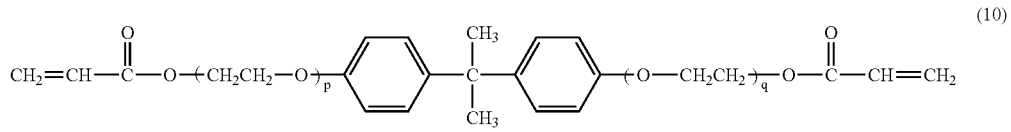

(10)

wherein p and q represent an integer of 1 to 9, and p+q=10.

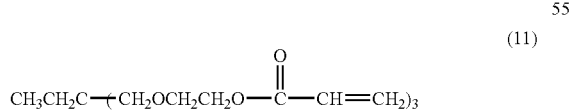

(11)

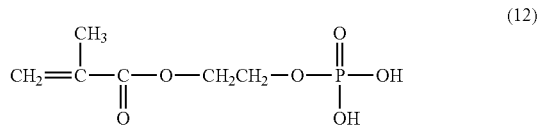

(12)

Example 16

In the same manner as in case of the composition of Example 8, except that 0.5 parts of gallic acid of Example 8 was replaced by 0.5 parts of hydroquinone, an ultraviolet curable composition of Example 16 was prepared.

Example 17

In the same manner as in case of the composition of Example 8, except that 0.5 parts of gallic acid of Example 8 was replaced by 0.5 parts of 2-hydroxyhydroquinone, an ultraviolet curable composition of Example 17 was prepared.

Example 18

In the same manner as in case of the composition of Example 8, except that 0.5 parts of gallic acid of Example 8 was replaced by 0.5 parts of resorcinol, an ultraviolet curable composition of Example 17 was prepared.

Example 19 to Example 21

In the same manner as in case of the composition of Example 8, except that gallic acid in Example 8 was replaced by hydroquinone and the content was adjusted to 1% by mass (Example 19), 3% by mass (Example 20) or 5% by mass (Example 21), ultraviolet curable compositions of Example 19 to Example 21 were prepared.

Example 22

In the same manner as in case of the composition of Example 1, except that 0.5 parts of gallic acid of Example 1 was replaced by 0.5 parts of hydroquinone, an ultraviolet curable composition of Example 22 was prepared.

Comparative Example 1

In the same manner as in case of the composition of Example 1, except that 0.05 parts of gallic acid was not used, an ultraviolet curable composition was prepared.

Comparative Example 2

In the same manner as in case of the composition of Example 1, except that 0.05 parts of gallic acid and 0.2 parts of an antioxidant (trade name: IRGANOX 1520L) were not used, an ultraviolet curable composition was prepared.

Comparative Example 3

In the same manner as in case of the composition of Example 1, except that 0.05 parts of gallic acid and 0.2 parts of an antioxidant (trade name: IRGANOX 1520L) were not used and 0.5 parts of phenylthioethyl acrylate (manufactured by BIMAX Corporation under the trade name of BX-PTEA) was used, an ultraviolet curable composition was prepared.

Comparative Example 4

In the same manner as in case of the composition of Example 13, except that 4-tert-butyl catechol in Example 13 was replaced by hydroquinone monomethyl ether, an ultraviolet curable composition was prepared.

Comparative Example 5

In the same manner as in case of the composition of Example 8, except that 0.5 parts of gallic acid of Example 8 was replaced by 0.5 parts of 4-ethoxyphenol, an ultraviolet curable composition of Comparative Example 5 was prepared.

Comparative Example 6

In the same manner as in case of the composition of Example 8, except that 0.5 parts of gallic acid of Example 8 was replaced by 0.5 parts of p-n-butylphenol, an ultraviolet curable composition of Comparative Example 6 was prepared.

Comparative Example 7

In the same manner as in case of the composition of Example 8, except that 0.5 parts of gallic acid of Example 8 was replaced by 0.5 parts of 2,3-dihydroxynaphthalene, ultraviolet curable composition of Comparative Example 7 was prepared.

Using the ultraviolet curable compositions of Examples 1 to Example 22 and Comparative Example 1 to 7, a light resistance test (fluorescent lamp exposure test) of a "DVD-9" type laminated optical disk comprising a semi-reflective layer made of a silver alloy was conducted by the following test procedure. The evaluation results are shown in Table 1 to Table 4, respectively. Using the ultraviolet curable compositions of Example 1 to Example 10, Example 16 to Example 22, Comparative Example 1 to Comparative Example 3 and Comparative Example 5 to Comparative Example 7, durability in a high-temperature and high-humidity atmosphere of a "DVD-9" type laminated optical disk comprising semi-reflective layer made of a silver alloy was evaluated by the following test procedure. The evaluation results are shown in Table 5 to Table 7, respectively.

<Light Resistance Test (Fluorescent Lamp Exposure Test)>

Each of the ultraviolet curable compositions of the above respective examples and comparative example was coated onto a polycarbonate substrate for optical disk, wherein recording information pits were provided and 50 nm thick aluminum thin film was laminated thereon using a dispenser. Then a polycarbonate substrate for optical disk, comprising 15 nm thick semi-reflective layer made of an alloy containing silver as a main component was laminated on the aforementioned substrate. Using a spin coater, the resulting laminate was rotated so that the resulting cured coating film has a thickness of about 50 to 60 μm. Using a xenon flash irradiation apparatus Model SBC-04 manufactured by USHIO INC., the laminate was irradiated with 10 shot ultraviolet light from the side of the substrate having a silver alloy semi-reflective layer at a programmed voltage of 1800 V in an air to obtain DVD-9 samples of the respective compositions.

With the above respective samples, an exposure test under a fluorescent lamp was conducted and light resistance was evaluated. Three 20 W fluorescent lamps (manufactured by Mitsubishi Electric Corporation, NEOLUMISUPER FLR20SW/M (20 watt)) were arranged in parallel on the same plane so as to adjust the center-distance of the fluorescent lamp to 9 cm and an optical disk was disposed at the position, which is 10 cm away from the center fluorescent lamp, so that the read side (side of the silver alloy semi-reflective layer) of the optical disk and fluorescent lamp face each other, and then an exposure test under a fluorescent lamp was conducted. After exposure for 72 hours, PI error and reflectance of each sample were measured and light resistance was evaluated.

<Durability Test in High-Temperature and High-Humidity Atmosphere>

Each sample was subjected to an exposure test under high-temperature and high-humidity conditions, in addition to the above light resistance test.

Using "PR-2PK" manufactured by Espec Corporation, an exposure test was conducted in a high-temperature and high-humidity atmosphere at 80° C. and 85% RH for 240 hours. With respect to the samples before and after the test, PI error and reflectance of an information recording layer (referred to as L0) comprising a silver alloy semi-reflective layer were evaluated.

<Measurement of PI Error and Reflectance>

PI error and reflectance were measured by "SA-300" manufactured by Audio Development Corporation. A PI error ratio (number of errors after test/number of errors before test) and a ratio (%) of reflectance [(reflectance after test/reflectance before test)×100] were determined by calculation and the results were evaluated.

PI error was evaluated by the following criteria.

A: PI error ratio is 5 or less.

B: PI error ratio is more than 5 and 6 or less.

C: PI error ratio is more than 6.

Reflectance was evaluated by the following criteria according to standard for DVD-9.

A: Reflectance after test is from 18 to 30%.

B: Reflectance after test is less than 18 and 16 or more.

C: Reflectance after test is less than 16%.

Abbreviations of compounds in the tables mean the following compounds.

DPGDA: dipropylene glycol diacrylate
LAC: lauryl acrylate
DMAEB: ethyl dimethylaminobenzoate
TMBDPO: 2,4,6-trimethylbenzoyl diphenylphosphine oxide
HCHPK: 1-hydroxycyclohexyl phenyl ketone
PTEAC: phenylthioethyl acrylate

TABLE 1

Signal characteristics of silver alloy semi-film (LO) side before and after light resistance test

| | | Example 1 | Example 2 | Example 3 | Example 4 | Example 5 | Example 6 | Comp. Example 1 |
|---|---|---|---|---|---|---|---|---|
| Composition % by mass | FAU-74SN | 7 | 7 | 7 | 7 | 7 | 7 | 7 |
| | V-5530 | 8 | 8 | 8 | 8 | 8 | 8 | 8 |
| | Compound of the formula 9 | 40 | 40 | 40 | 40 | 40 | 40 | 40 |
| | Compound of the formula 10 | 18 | 18 | 18 | 18 | 18 | 18 | 18 |
| | Compound of the formula 11 | 1.8 | 1.8 | 1.8 | 1.8 | 1.8 | 1.8 | 1.8 |
| | Compound of the formula 12 | 0.1 | 0.1 | 0.1 | 0.1 | 0.1 | 0.1 | 0.1 |
| | DPGDA | 11 | 11 | 11 | 11 | 11 | 11 | 11 |
| | LAC | 8 | 8 | 8 | 8 | 8 | 8 | 8 |
| | DMAEB | 0.1 | 0.1 | 0.1 | 0.1 | 0.1 | 0.1 | 0.1 |
| | TMBDPO | 2 | 2 | 2 | 2 | 2 | 2 | 2 |
| | HCHPK | 4 | 4 | 4 | 4 | 4 | 4 | 4 |
| | Gallic acid | 0.05 | 0.1 | 0.5 | 5 | 6 | — | — |
| | Propyl gallate | — | — | — | — | — | 0.5 | — |
| | PTEAC | — | — | — | — | — | — | — |
| | 1520L | 0.2 | 0.2 | 0.2 | 0.2 | 0.2 | 0.2 | 0.2 |
| PI error | Number of errors before test | 17 | 13 | 15 | 19 | 11 | 19 | 13 |
| | Number of errors after test | 32 | 22 | 25 | 34 | 21 | 28 | 73 |
| | PI error ratio | 1.9 | 1.7 | 1.7 | 1.8 | 1.9 | 1.5 | 5.6 |
| | Judgment | A | A | A | A | A | A | B |
| Reflectance | Before test (%) | 24.2 | 24.3 | 24.5 | 24.4 | 24.5 | 24.4 | 24.1 |
| | After test (%) | 18.0 | 18.0 | 18.5 | 21.4 | 22.0 | 18.2 | 15.8 |
| | Reflectance ratio (%) | 74.4 | 74.1 | 75.5 | 87.7 | 89.8 | 74.6 | 65.6 |
| | Judgment | A | A | A | A | A | A | C |

TABLE 2

Signal characteristics of silver alloy semi-film (LO) side before and after light resistance test

| | | Example 7 | Example 8 | Example 9 | Example 10 | Comp. Example 2 | Comp. Example 3 |
|---|---|---|---|---|---|---|---|
| Composition % by mass | FAU-74SN | 7 | 7 | 7 | 7 | 7 | 7 |
| | V-5530 | 8 | 8 | 8 | 8 | 8 | 8 |
| | Compound of the formula 9 | 40 | 40 | 40 | 40 | 40 | 40 |
| | Compound of the formula 10 | 18 | 18 | 18 | 18 | 18 | 18 |
| | Compound of the formula 11 | 1.8 | 1.8 | 1.8 | 1.8 | 1.8 | 1.8 |
| | Compound of the formula 12 | 0.1 | 0.1 | 0.1 | 0.1 | 0.1 | 0.1 |
| | DPGDA | 11 | 11 | 11 | 11 | 11 | 11 |
| | LAC | 8 | 8 | 8 | 8 | 8 | 8 |
| | DMAEB | 0.1 | 0.1 | 0.1 | 0.1 | 0.1 | 0.1 |
| | TMBDPO | 2 | 2 | 2 | 2 | 2 | 2 |
| | HCHPK | 4 | 4 | 4 | 4 | 4 | 4 |
| | Gallic acid | 0.1 | 0.5 | 2 | 5 | — | — |
| | Propyl gallate | — | — | — | — | — | — |

TABLE 2-continued

Signal characteristics of silver alloy semi-film (LO) side before and after light resistance test

|  |  | Example 7 | Example 8 | Example 9 | Example 10 | Comp. Example 2 | Comp. Example 3 |
|---|---|---|---|---|---|---|---|
|  | PTEAC | — | — | — | — | — | 0.5 |
|  | 1520L | — | — | — | — | — | — |
| PI error | Number of errors before test | 15 | 15 | 14 | 16 | 14 | 14 |
|  | Number of errors after test | 23 | 18 | 17 | 43 | 111 | 90 |
|  | PI error ratio | 1.5 | 1.2 | 1.2 | 2.7 | 7.9 | 6.4 |
|  | Judgment | A | A | A | A | C | C |
| Reflectance (%) | Before test (%) | 24.0 | 24.4 | 24.2 | 24.0 | 23.8 | 23.8 |
|  | After test (%) | 18.4 | 19.0 | 19.6 | 20.2 | 15.3 | 15.7 |
|  | Reflectance ratio (%) | 76.7 | 77.9 | 81.0 | 84.2 | 64.3 | 66.0 |
|  | Judgment | A | A | A | A | C | C |

TABLE 3

Signal characteristics of silver alloy semi-film (LO) side before and after light resistance test

|  |  | Example 11 | Example 12 | Example 13 | Example 14 | Example 15 | Comp. Example 4 |
|---|---|---|---|---|---|---|---|
| Composition % by mass | FAU-74SN | 7 | 7 | 7 | 7 | 7 | 7 |
|  | V-5530 | 8 | 8 | 8 | 8 | 8 | 8 |
|  | Compound of the formula 9 | 40 | 40 | 40 | 40 | 40 | 40 |
|  | Compound of the formula 10 | 18 | 18 | 18 | 18 | 18 | 18 |
|  | Compound of the formula 11 | 1.8 | 1.8 | 1.8 | 1.8 | 1.8 | 1.8 |
|  | Compound of the formula 12 | 0.1 | 0.1 | 0.1 | 0.1 | 0.1 | 0.1 |
|  | DPGDA | 11 | 11 | 11 | 11 | 11 | 11 |
|  | LAC | 8 | 8 | 8 | 8 | 8 | 8 |
|  | DMAEB | 0.1 | 0.1 | 0.1 | 0.1 | 0.1 | 0.1 |
|  | TMBDPO | 2 | 2 | 2 | 2 | 2 | 2 |
|  | HCHPK | 4 | 4 | 4 | 4 | 4 | 4 |
|  | 4-t-butyl catechol | 0.05 | 0.1 | 0.5 | 1 | 5 | — |
|  | Hydroquinone monomethyl ether | — | — | — | — | — | 0.5 |
|  | 1520L | 0.2 | 0.2 | 0.2 | 0.2 | 0.2 | 0.2 |
| PI error | Number of errors before test | 48 | 49 | 50 | 49 | 49 | 51 |
|  | Number of errors after test | 59.5 | 61 | 62 | 63 | 63 | 283 |
|  | PI error ratio | 1.2 | 1.2 | 1.2 | 1.3 | 1.3 | 5.5 |
|  | Judgment | A | A | A | A | A | B |
| Reflectance | Before test (%) | 24.3 | 24.2 | 24.2 | 24.7 | 24.8 | 24 |
|  | After test (%) | 18.5 | 18.6 | 19.3 | 21.1 | 23.2 | 16.9 |
|  | Reflectance ratio (%) | 76.1 | 76.9 | 79.8 | 85.4 | 93.5 | 70.4 |
|  | Judgment | A | A | A | A | A | C |

TABLE 4

Signal characteristics of silver alloy semi-film (LO) side before and after light resistance test

|  |  | Example 16 | Example 17 | Example 18 | Example 19 | Example 20 |
|---|---|---|---|---|---|---|
| Composition % by mass | FAU-74SN | 7 | 7 | 7 | 7 | 7 |
|  | V-5530 | 8 | 8 | 8 | 8 | 8 |
|  | Compound of the formula 9 | 40 | 40 | 40 | 40 | 40 |
|  | Compound of the formula 10 | 18 | 18 | 18 | 18 | 18 |
|  | Compound of the formula 11 | 1.8 | 1.8 | 1.8 | 1.8 | 1.8 |
|  | Compound of the formula 12 | 0.1 | 0.1 | 0.1 | 0.1 | 0.1 |
|  | DPGDA | 11 | 11 | 11 | 11 | 11 |
|  | LAC | 8 | 8 | 8 | 8 | 8 |
|  | DMAEB | 0.1 | 0.1 | 0.1 | 0.1 | 0.1 |
|  | TMBDPO | 2 | 2 | 2 | 2 | 2 |
|  | HCHPK | 4 | 4 | 4 | 4 | 4 |
|  | Hydroquinone | 0.5 | — | — | 1 | 3 |
|  | 2-hydroxyhydroquinone | — | 0.5 | — | — | — |

TABLE 4-continued

Signal characteristics of silver alloy semi-film (LO) side before and after light resistance test

|  |  |  |  |  |  |  |
|---|---|---|---|---|---|---|
|  | Resorcinol | — | — | 0.5 | — | — |
|  | 4-ethoxyphenol | — | — | — | — | — |
|  | p-n-butylphenol | — | — | — | — | — |
|  | 2,3-dihydroxynaphthalene | — | — | — | — | — |
|  | 1520L | — | — | — | — | — |
| PI error | Number of errors before test | 15 | 15 | 13 | 16 | 19 |
|  | Number of errors after test | 35 | 29 | 29 | 28 | 36 |
|  | PI error ratio | 2.3 | 1.9 | 2.2 | 1.8 | 1.9 |
|  | Judgment | A | A | A | A | A |
| Reflectance | Before test (%) | 24.0 | 24.2 | 23.8 | 24.0 | 23.8 |
|  | After test (%) | 22.3 | 22.9 | 18.3 | 22.4 | 22.7 |
|  | Reflectance ratio (%) | 92.9 | 94.6 | 76.9 | 93.3 | 95.4 |
|  | Judgment | A | A | A | A | A |

|  |  | Example 21 | Example 22 | Comp. Example 5 | Comp. Example 6 | Comp. Example 7 |
|---|---|---|---|---|---|---|
| Composition % by mass | FAU-74SN | 7 | 7 | 7 | 7 | 7 |
|  | V-5530 | 8 | 8 | 8 | 8 | 8 |
|  | Compound of the formula 9 | 40 | 40 | 40 | 40 | 40 |
|  | Compound of the formula 10 | 18 | 18 | 18 | 18 | 18 |
|  | Compound of the formula 11 | 1.8 | 1.8 | 1.8 | 1.8 | 1.8 |
|  | Compound of the formula 12 | 0.1 | 0.1 | 0.1 | 0.1 | 0.1 |
|  | DPGDA | 11 | 11 | 11 | 11 | 11 |
|  | LAC | 8 | 8 | 8 | 8 | 8 |
|  | DMAEB | 0.1 | 0.1 | 0.1 | 0.1 | 0.1 |
|  | TMBDPO | 2 | 2 | 2 | 2 | 2 |
|  | HCHPK | 4 | 4 | 4 | 4 | 4 |
|  | Hydroquinone | 5 | 0.5 | — | — | — |
|  | 2-hydroxyhydroquinone | — | — | — | — | — |
|  | Resorcinol | — | — | — | — | — |
|  | 4-ethoxyphenol | — | — | 0.5 | — | — |
|  | p-n-butylphenol | — | — | — | 0.5 | — |
|  | 2,3-dihydroxynaphthalene | — | — | — | — | 0.5 |
|  | 1520L | — | 0.2 | — | — | — |
| PI error | Number of errors before test | 12 | 14 | 14 | 18 | 17 |
|  | Number of errors after test | 30 | 30 | 85 | 92 | 95 |
|  | PI error ratio | 2.5 | 2.1 | 6.1 | 5.1 | 5.6 |
|  | Judgment | A | A | C | B | B |
| Reflectance | Before test (%) | 23.8 | 23.6 | 23.9 | 24.1 | 24.0 |
|  | After test (%) | 22.8 | 22.1 | 16.0 | 16.2 | 16.0 |
|  | Reflectance ratio (%) | 95.8 | 93.6 | 66.9 | 67.2 | 66.7 |
|  | Judgment | A | A | C | C | C |

TABLE 5

Signal characteristics before and after high-temperature and high-humidity test

|  |  | Example 1 | Example 2 | Example 3 | Example 4 | Example 5 | Example 6 | Comp. Example 1 |
|---|---|---|---|---|---|---|---|---|
| Composition % by mass | FAU-74SN | 7 | 7 | 7 | 7 | 7 | 7 | 7 |
|  | V-5530 | 8 | 8 | 8 | 8 | 8 | 8 | 8 |
|  | Compound of the formula 9 | 40 | 40 | 40 | 40 | 40 | 40 | 40 |
|  | Compound of the formula 10 | 18 | 18 | 18 | 18 | 18 | 18 | 18 |
|  | Compound of the formula 11 | 1.8 | 1.8 | 1.8 | 1.8 | 1.8 | 1.8 | 1.8 |
|  | Compound of the formula 12 | 0.1 | 0.1 | 0.1 | 0.1 | 0.1 | 0.1 | 0.1 |
|  | DPGDA | 11 | 11 | 11 | 11 | 11 | 11 | 11 |
|  | LAC | 8 | 8 | 8 | 8 | 8 | 8 | 8 |
|  | DMAEB | 0.1 | 0.1 | 0.1 | 0.1 | 0.1 | 0.1 | 0.1 |
|  | TMBDPO | 2 | 2 | 2 | 2 | 2 | 2 | 2 |
|  | HCHPK | 4 | 4 | 4 | 4 | 4 | 4 | 4 |
|  | Gallic acid | 0.05 | 0.1 | 0.5 | 5 | 6 | — | — |
|  | Propyl gallate | — | — | — | — | — | 0.5 | — |
|  | PTEAC | — | — | — | — | — | — | — |
|  | 1520L | 0.2 | 0.2 | 0.2 | 0.2 | 0.2 | 0.2 | 0.2 |
| PI error | Number of errors before test | 15 | 15 | 13 | 17 | 13 | 19 | 19 |
|  | Number of errors after | 60 | 65 | 34 | 58 | 43 | 105 | 101 |

TABLE 5-continued

Signal characteristics before and after high-temperature and high-humidity test

| | | Example 1 | Example 2 | Example 3 | Example 4 | Example 5 | Example 6 | Comp. Example 1 |
|---|---|---|---|---|---|---|---|---|
| | test | | | | | | | |
| | PI error ratio | 4.0 | 4.3 | 2.6 | 3.4 | 3.3 | 5.5 | 5.3 |
| | Judgment | A | A | A | A | A | B | B |
| Reflectance (%) | Before test (%) | 23.2 | 23.5 | 23.4 | 23.2 | 23.3 | 23.3 | 23.3 |
| | After test (%) | 21.7 | 21.7 | 22.1 | 22.6 | 22.5 | 21.0 | 19.2 |
| | Reflectance ratio (%) | 93.5 | 92.3 | 94.4 | 97.4 | 96.6 | 90.1 | 82.4 |
| | Judgment | A | A | A | A | A | A | A |

TABLE 6

Signal characteristics before and after high-temperature and high-humidity test

| | | Example 7 | Example 8 | Example 9 | Example 10 | Comp. Example 2 | Comp. Example 3 |
|---|---|---|---|---|---|---|---|
| Composition % by mass | FAU-74SN | 7 | 7 | 7 | 7 | 7 | 7 |
| | V-5530 | 8 | 8 | 8 | 8 | 8 | 8 |
| | Compound of the formula 9 | 40 | 40 | 40 | 40 | 40 | 40 |
| | Compound of the formula 10 | 18 | 18 | 18 | 18 | 18 | 18 |
| | Compound of the formula 11 | 1.8 | 1.8 | 1.8 | 1.8 | 1.8 | 1.8 |
| | Compound of the formula 12 | 0.1 | 0.1 | 0.1 | 0.1 | 0.1 | 0.1 |
| | DPGDA | 11 | 11 | 11 | 11 | 11 | 11 |
| | LAC | 8 | 8 | 8 | 8 | 8 | 8 |
| | DMAEB | 0.1 | 0.1 | 0.1 | 0.1 | 0.1 | 0.1 |
| | TMBDPO | 2 | 2 | 2 | 2 | 2 | 2 |
| | HCHPK | 4 | 4 | 4 | 4 | 4 | 4 |
| | Gallic acid | 0.1 | 0.5 | 2 | 5 | — | — |
| | Propyl gallate | — | — | — | — | — | — |
| | PTEAC | — | — | — | — | — | 0.5 |
| | 1520L | — | — | — | — | — | — |
| PI error | Number of errors before test | 15 | 14 | 16 | 14 | 16 | 15 |
| | Number of errors after test | 35 | 29 | 34 | 38 | 192 | 90 |
| | PI error ratio | 2.3 | 2.1 | 2.1 | 2.7 | 12.0 | 6.0 |
| | Judgment | A | A | A | A | C | C |
| Reflectance (%) | Before test (%) | 24.0 | 24.0 | 24.2 | 23.9 | 24.0 | 24.2 |
| | After test (%) | 21.5 | 22.2 | 21.9 | 22.0 | 16.5 | 16.6 |
| | Reflectance ratio (%) | 89.6 | 92.5 | 90.5 | 92.1 | 68.8 | 68.6 |
| | Judgment | A | A | A | A | C | C |

TABLE 7

Signal characteristics before and after high-temperature and high-humidity test

| | | Example 16 | Example 17 | Example 18 | Example 19 | Example 20 |
|---|---|---|---|---|---|---|
| Composition % by mass | FAU-74SN | 7 | 7 | 7 | 7 | 7 |
| | V-5530 | 8 | 8 | 8 | 8 | 8 |
| | Compound of the formula 9 | 40 | 40 | 40 | 40 | 40 |
| | Compound of the formula 10 | 18 | 18 | 18 | 18 | 18 |
| | Compound of the formula 11 | 1.8 | 1.8 | 1.8 | 1.8 | 1.8 |
| | Compound of the formula 12 | 0.1 | 0.1 | 0.1 | 0.1 | 0.1 |
| | DPGDA | 11 | 11 | 11 | 11 | 11 |
| | LAC | 8 | 8 | 8 | 8 | 8 |
| | DMAEB | 0.1 | 0.1 | 0.1 | 0.1 | 0.1 |
| | TMBDPO | 2 | 2 | 2 | 2 | 2 |
| | HCHPK | 4 | 4 | 4 | 4 | 4 |
| | Hydroquinone | 0.5 | — | — | 1 | 3 |
| | 2-hydroxyhydroquinone | — | 0.5 | — | — | — |
| | Resorcinol | — | — | 0.5 | — | — |
| | 4-ethoxyphenol | — | — | — | — | — |
| | p-n-butylphenol | — | — | — | — | — |
| | 2,3-dihydroxynaphthalene | — | — | — | — | — |
| | 1520L | — | — | — | — | — |

TABLE 7-continued

| | Signal characteristics before and after high-temperature and high-humidity test | | | | | |
|---|---|---|---|---|---|---|
| PI error | Number of errors before test | 14 | 16 | 22 | 18 | 16 |
| | Number of errors after test | 21 | 50 | 260 | 37 | 38 |
| | PI error ratio | 1.5 | 3.1 | 11.8 | 2.1 | 2.4 |
| | Judgment | A | A | C | A | A |
| Reflectance | Before test (%) | 24.0 | 24.2 | 23.8 | 23.8 | 23.9 |
| | After test (%) | 23.5 | 23.5 | 17.6 | 23.4 | 23.4 |
| | Reflectance ratio (%) | 97.9 | 97.1 | 73.9 | 98.3 | 97.9 |
| | Judgment | A | A | C | A | A |

| | | Example 21 | Example 22 | Comp. Example 5 | Comp. Example 6 | Comp. Example 7 |
|---|---|---|---|---|---|---|
| Composition % by mass | FAU-74SN | 7 | 7 | 7 | 7 | 7 |
| | V-5530 | 8 | 8 | 8 | 8 | 8 |
| | Compound of the formula 9 | 40 | 40 | 40 | 40 | 40 |
| | Compound of the formula 10 | 18 | 18 | 18 | 18 | 18 |
| | Compound of the formula 11 | 1.8 | 1.8 | 1.8 | 1.8 | 1.8 |
| | Compound of the formula 12 | 0.1 | 0.1 | 0.1 | 0.1 | 0.1 |
| | DPGDA | 11 | 11 | 11 | 11 | 11 |
| | LAC | 8 | 8 | 8 | 8 | 8 |
| | DMAEB | 0.1 | 0.1 | 0.1 | 0.1 | 0.1 |
| | TMBDPO | 2 | 2 | 2 | 2 | 2 |
| | HCHPK | 4 | 4 | 4 | 4 | 4 |
| | Hydroquinone | 5 | 0.5 | — | — | — |
| | 2-hydroxyhydroquinone | — | — | — | — | — |
| | Resorcinol | — | — | — | — | — |
| | 4-ethoxyphenol | — | — | 0.5 | — | — |
| | p-n-butylphenol | — | — | — | 0.5 | — |
| | 2,3-dihydroxynaphthalene | — | — | — | — | 0.5 |
| | 1520L | — | 0.2 | — | — | — |
| PI error | Number of errors before test | 19 | 14 | 13 | 13 | 22 |
| | Number of errors after test | 35 | 22 | 170 | 92 | 218 |
| | PI error ratio | 1.8 | 1.6 | 13.1 | 7.1 | 9.9 |
| | Judgment | A | A | C | C | C |
| Reflectance | Before test (%) | 24.1 | 23.9 | 23.9 | 24.1 | 24.0 |
| | After test (%) | 23.3 | 23.4 | 16.0 | 16.2 | 16.0 |
| | Reflectance ratio (%) | 96.7 | 97.9 | 66.9 | 67.2 | 66.7 |
| | Judgment | A | A | C | C | C |

INDUSTRIAL APPLICABILITY

According to the present invention, an optical disk can be obtained which does not cause blackening of a reflective layer made of silver or an alloy containing silver as a main component and also causes no increase in read error (PI error) of signals and less change in reflectance even when exposed to room light such as fluorescent lamp. Therefore, it becomes easy to use, as a material of a semi-reflective layer or reflective layer which forms an information recording layer, silver or an alloy containing silver as a main component and also it becomes possible to supply a high-reliable optical disk such as "DVD-9" at a low cost.

The invention claimed is:

1. An optical disk comprising a first substrate, a first reflective layer for reflecting laser beams for information reading formed on the first substrate, and a resin layer made of a cured film of an ultraviolet curable composition formed on the first reflective layer, wherein
the first reflective layer is a reflective layer made of silver or an alloy containing silver as a main component, and
the ultraviolet curable composition contains:
(a) a radical polymerizable compound,
(b) a compound represented by the formula (3):

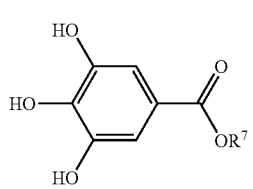

(3)

wherein $R^7$ represents an alkyl group having 1 to 20 carbon atoms which may be substituted with a hydrogen atom or a halogen atom, or an alkenyl group having 1 to 20 carbon atoms which may be substituted with a halogen atom, and
(c) a radical photopolymerization initiator.

2. The optical disk according to claim 1, wherein a second substrate comprising a second reflective layer for reflecting laser beams for information reading formed thereon is formed on the resin layer so as to contact the resin layer with the second reflective layer.

3. The optical disk according to claim 2, wherein the content of the compound represented by the formula (1) is from 0.05 to 10% by mass based on the total amounts of the ultraviolet curable composition.

4. The optical disk according to claim 1, wherein the content of the compound represented by the formula (1) is from 0.05 to 10% by mass based on the total amounts of the ultraviolet curable composition.

* * * * *